United States Patent [19]

Pedersen et al.

[11] Patent Number: 4,946,330
[45] Date of Patent: Aug. 7, 1990

[54] TRUCK RESTRAINT

[75] Inventors: Paul A. Pedersen, Guelph; John E. Pedersen, Puslinch, both of Canada

[73] Assignee: Pentalift Equipment Corporation, Guelph, Canada

[21] Appl. No.: 265,529

[22] Filed: Nov. 1, 1988

[30] Foreign Application Priority Data

Sep. 14, 1988 [CA] Canada .................................. 577338

[51] Int. Cl.⁵ ...................... B65G 67/02; B65G 69/00
[52] U.S. Cl. ................................. 414/401; 414/917; 14/71.1
[58] Field of Search ............... 414/396, 401, 584, 917; 14/71.1, 71.3

[56] References Cited

U.S. PATENT DOCUMENTS

| | | | |
|---|---|---|---|
| 4,016,989 | 4/1977 | Furnari | 414/401 X |
| 4,191,503 | 3/1980 | Neff et al. | 414/401 |
| 4,208,161 | 6/1980 | Hipp et al. | 414/401 |
| 4,282,621 | 8/1981 | Anthony et al. | 14/71.1 |
| 4,379,354 | 4/1983 | Hahn et al. | 14/71.3 |
| 4,472,099 | 9/1984 | Hahn et al. | 414/401 |
| 4,555,211 | 11/1985 | Metz | 14/71.1 X |
| 4,560,315 | 12/1985 | Hahn | 414/401 |
| 4,630,989 | 12/1986 | Davey | 414/401 |
| 4,671,728 | 6/1987 | Clark et al. | 414/401 |
| 4,674,941 | 6/1987 | Hageman | 414/401 |
| 4,692,755 | 9/1987 | Hahn | 414/401 |
| 4,735,542 | 4/1988 | Fisher et al. | 414/401 |
| 4,759,678 | 7/1988 | Hageman | 414/401 |
| 4,818,170 | 4/1989 | Fisher et al. | 414/401 |

FOREIGN PATENT DOCUMENTS 1055566  11/1983  U.S.S.R. .............. 414/917

OTHER PUBLICATIONS

Levelators, The Rotary Lift Company, 1947, p. 14.

Primary Examiner—Robert J. Spar
Assistant Examiner—Robert S. Katz
Attorney, Agent, or Firm—Basile & Hanlon

[57] ABSTRACT

Apparatus for restraining movement of a parked vehicle away from a loading dock comprises an upwardly extending block which is movable from a lower position to an upper position which captures a portion of the parked vehicle to restrain movement of the parked vehicle away from the loading dock. This apparatus provides a safety lock system to ensure that during loading and unloading of a parked vehicle the vehicle cannot accidentally pull away from the loading dock which would result in injury to the forklift truck operator. A linkage mechanism is provided which provides for the raising and lowering of the block. A drive mechanism raises and lowers the linkage in determining the lower an upper positions of the block. The linkage comprises two spaced-apart linked arms which may be in the form of a parallelogram linkage arrangement.

10 Claims, 8 Drawing Sheets

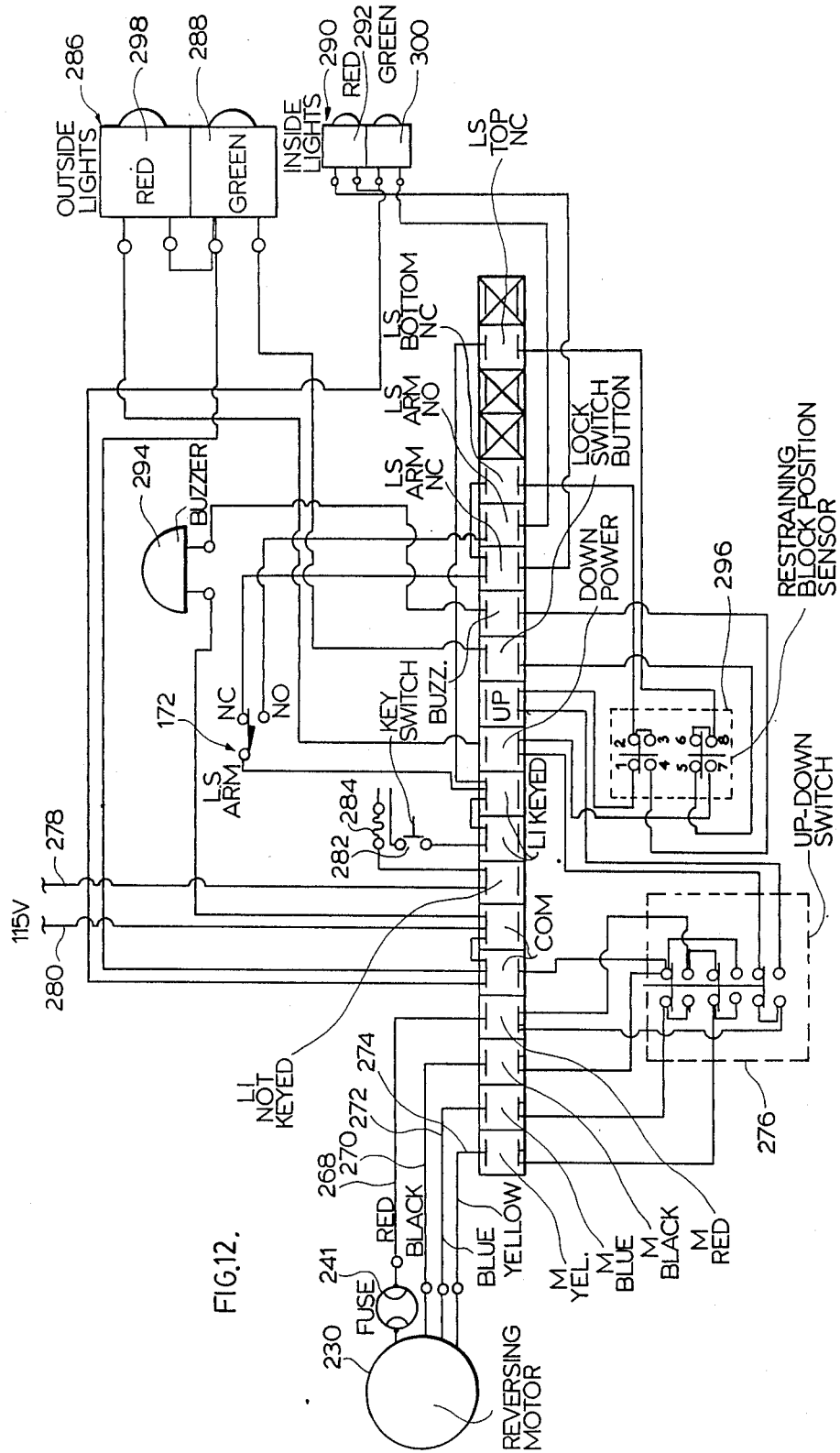

TRUCK RESTRAINT

FIELD OF THE INVENTION

This invention relates to devices for restraining parked vehicle movement away from a loading dock or other types of fixed structures.

BACKGROUND OF THE INVENTION

There is normally considerable activity around a loading dock for factories, warehouses and the like. Normally the transport vehicles to be loaded or unloaded with equipment and goods are parked against the dock to enable forklift trucks and the like to travel onto and off of the vehicle. Quite often dock levellers are used in conjunction with such docks to bridge the gap between the dock and the truck vehicle. There have been instances, particularly in busy dock areas, where the parked vehicle moves away from the dock, either due to driver error in not realizing that the vehicle is still being unloaded, or because a braking mechanism or the like is not in place and the vehicle simply rolls away from the dock. This can result in very hazardous conditions, for example, should the forklift operator be driving onto the truck bed or off of it and the vehicle begins to move away, the forklift truck can fall from the dock causing injury to the operator and loss of equipment and product. It is therefore important to provide a device which will engage a portion of the parked vehicle frame to ensure that it is held in place or restrained in moving away from the dock.

U.S. Pat. No. 4,191,503 discloses a hook and cable arrangement for restraining movement of the parked vehicle. The hook is attached to a suitable portion of the vehicle frame and the cable drawn in until the cable is taut thereby restraining vehicle movement away from the dock.

U.S. Pat. No. 4,443,150 discloses a hook for engaging a portion of the vehicle, such as the ICC bar at the rear of the vehicle. The hook, as it remains in its outwardly extending position, can be moved manually from a lower position to an upper position at which point it engages the ICC bar of the vehicle rear. A roller system is provided to raise and lower the guard to the desired elevation. The hook can then be raised and lowered from within the guard to either engage or disengage the ICC bar. A ratchet type mechanism holds the hook in the raised position in capturing the ICC bar of the vehicle.

There is also a variety of vehicle restraints which rely on pivotal rotation of a hook. The hook is pivoted from a depending position to an elevated position to engage a portion of the parked vehicle to restrain movement thereof away from the dock. Examples of pivotal arrangements for the various types of hook devices are disclosed in U.S. Pat. Nos. 4,208,161, 4,282,621, 4,379,354 and 4,560,315. With reference to these patents, in one manner or another the vehicle engaging hook device is pivoted from a dependent position to an elevated position to engage the ICC bar. It is appreciated that a variety of sensors may be used in combination with these devices to indicate when the hook has engaged the vehicle to restrain movement away from the dock.

U.S. Pat. No. 4,472,099 discloses another form of pivotal swinging of a hook to engage the vehicle ICC bar or the like. A ram, in combination with a pivotal lever 24, is used to swing the hook from the dependent position to the elevated vehicle engaging position. The lever, as it is pivoted by the ram, has an end portion which slides along the rear portion of the hook to cause rotation of the hook from the depending to the elevated position. U.S. Pat. No. 4,630,989 discloses the use of a hydraulic ram to pivotally swing a bar from a horizontal to vertical position. The bar, when elevated to the vertical position, captures the ICC bar portion of the vehicle to restrain movement of the vehicle away from the dock.

Problems associated with these types of systems are the lack of durability and/or ineffective capturing of a vehicle portion to restrain the vehicle against a dock.

SUMMARY OF THE INVENTION

According to an aspect of this invention, an apparatus is provided for restraining movement of a parked vehicle away from a fixed structure. The apparatus comprises a support frame, an upwardly extending block, a linkage having two spaced-apart link arms and means for driving the linkage for raising and lowering the linkage. A first end of the two link arms is pivotally connected to the block and a second end of the two link arms is pivotally connected to the support frame. The drive means for raising and lowering the first end of the linkage determines an upper position for the block to capture a portion of a vehicle frame to restrain a parked vehicle and a lower position for the block to permit a parked vehicle to move away from a fixed structure.

BRIEF DESCRIPTION OF THE DRAWINGS

Preferred embodiments of the invention are shown in the drawings wherein:

FIG. 12 is an electrical schematic showing details of the system control for the embodiment of FIG. 11.

DETAILED DESCRIPTION OF THE PREFERRED EMBODIMENTS

Figure 1:
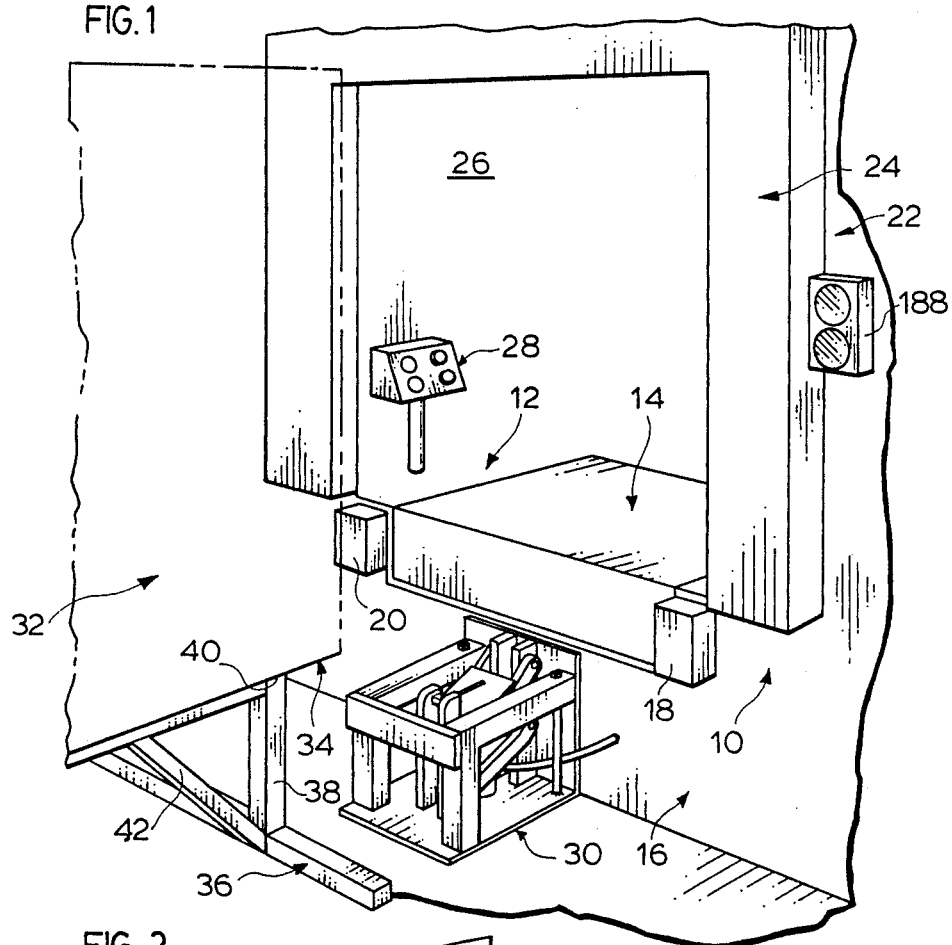
FIG. 1 is a perspective view of a preferred embodiment of the apparatus of this invention with a vehicle backing up towards the loading dock.

With reference to FIG. 1, a dock generally designated 10 has a platform surface 12. Within a well provided in the platform 12, a dock leveller 14 is secured in place. Across the face 16 of the dock are secured two resilient blocks 18 and 20 to provide bumpers against which the vehicle rear may abut when backing the truck up against the dock. The dock may also include an enclosure generally designated 22 with a perimeter frame 24 to define an entrance 26. Adjacent the entrance 26 is a control panel 28 which controls the operation of the apparatus 30 according to this invention. The vehicle 32 is representative of the common, type of vehicle trailer or cargo hold. At the rear 34 of the trailer is the standard type of ICC bar 36. The ICC bar is provided to prevent smaller vehicles, such as cars, accidentally driving under the trailer so as to provide a degree of protection for the vehicle driver. The ICC bar may be mounted on the trailer in a variety of ways. As shown in FIG. 1, the ICC bar is connected to vertical struts 38 which are in turn connected to the bottom 40 of the vehicle. Braces 42 are provided to resist pushing of the ICC bar inwardly of the trailer. As a result, the ICC bar provides a very convenient portion of the vehicle which may be captured by the apparatus of this invention to restrain a parked vehicle against the dock 10.

Figure 2:
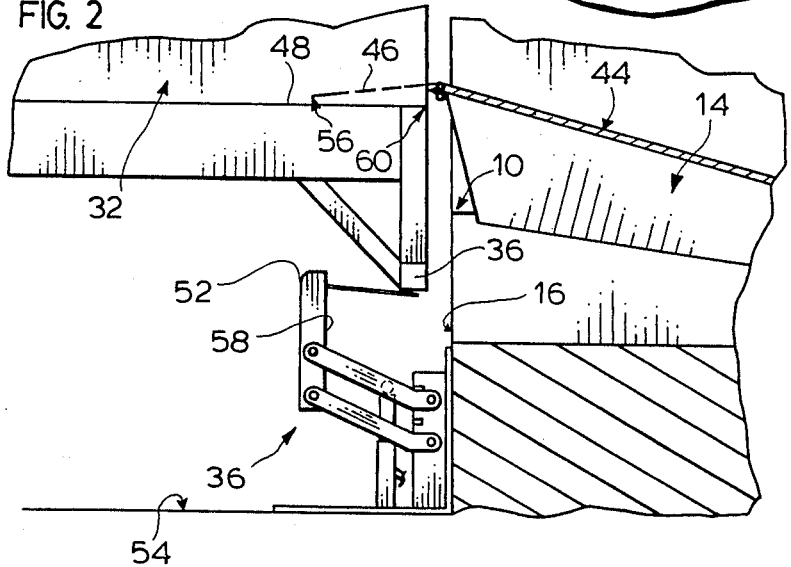
FIG. 2 is a side elevation of the vehicle parked against the dock with the apparatus of this invention in the elevated position.

As shown in FIG. 2, the vehicle 32 is backed up adjacent the face 16 with the ICC bar 36 spaced slightly from the dock 10. The dock leveller 14 has its deck 44 elevated slightly with the lip 46 resting on the vehicle bed 48. This enables a forklift truck or other product moving device to ride up the ramp 44 onto the vehicle bed 48. For the reasons already explained, it is important to restrain the parked vehicle 32 from moving outwardly away from the dock 10. The apparatus 30, in accordance with this invention, accomplishes this purpose by capturing the ICC bar 36 between the dock face 16 and a vertically extending block 50. The block 50 is elevated to a height indicated by the upper edge 52 thereof, which is well above the height of the ICC bar 36 relative to the ground level 54. Should, for whatever reason, the vehicle move forward, the ICC bar will contact the vertically extending block 50. This will restrain or stop any further forward movement of the vehicle. As is shown, the end indicated by arrow 56 for the lip is beyond the inner edge 58 of the block 50 so that in restraining the vehicle by contact of the inner edge 58 with the ICC bar 36 the outer edge 56 of the lip is still within the rear portion 60 of the vehicle bed 48 so that the ramp 44 does not fall downwardly. Hence the apparatus 30 prevents any accidental dropping of the ramp should, for whatever reason, the vehicle move outwardly away from the dock face 16.

Figure 3:
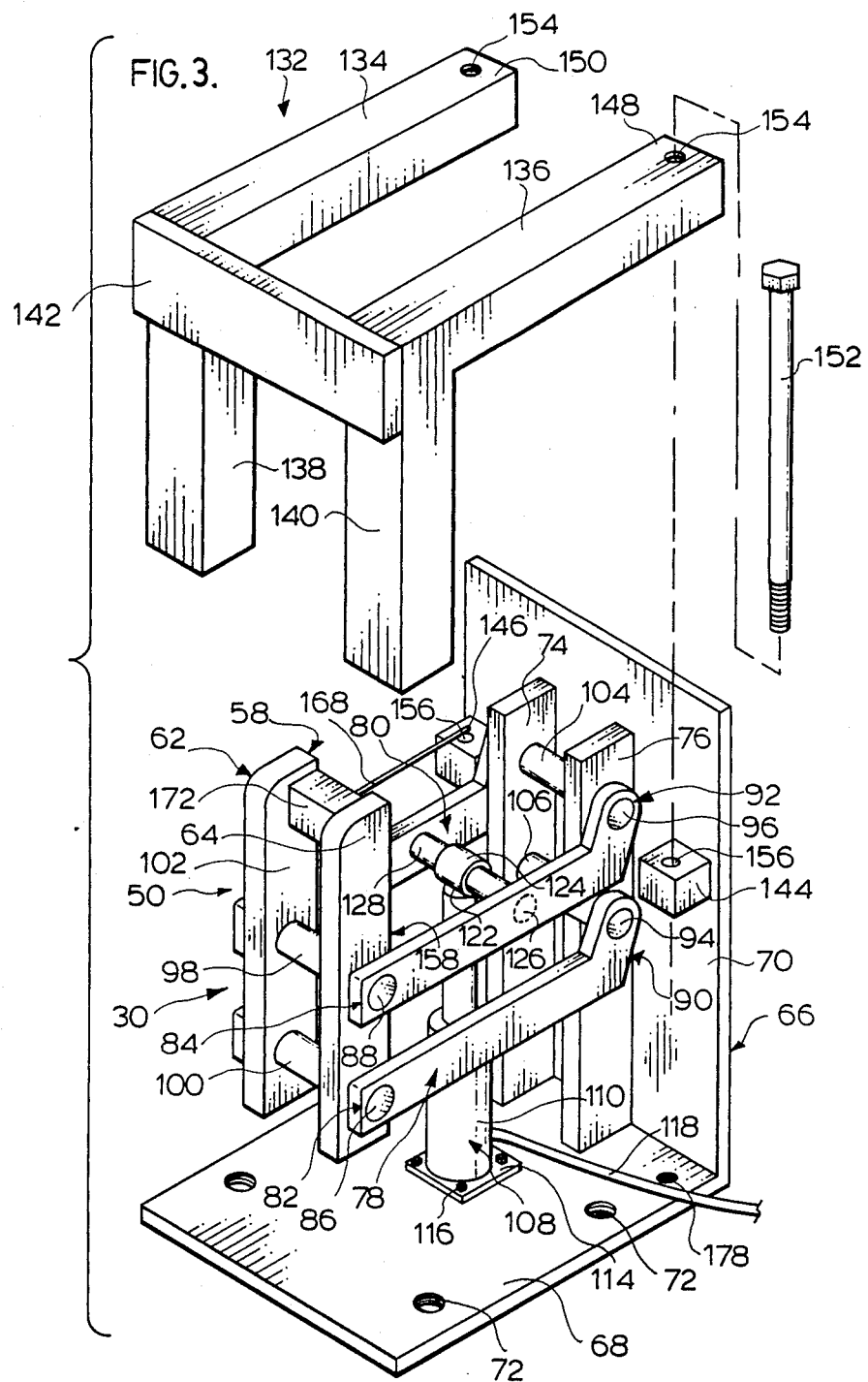
FIG. 3 is an exploded perspective view of the apparatus of FIG. 1.

As shown in more detail in FIG. 3, the apparatus 30 has a vertically extending block 50 comprising, in accordance with a preferred aspect of this invention, two rigid plate portions 62 and 64. The plate portions 62 and 64 present in combination the inner face 58 which contacts the ICC bar. The apparatus 30 has a support frame 66 consisting of base plate 68 and an upright plate 70. The base plate 68 may be secured to the concrete floor by use of lag bolts and the like extending through apertures 72. Similarly the upright plate 70 may be connected to the face 16 of the dock by appropriate lag screws or the like. The upright plate has secured thereto rigid brackets 74 and 76. To provide for upward movement of the block 50, a two-armed linkage is provided. In accordance with a preferred aspect of this invention, a pair of two-armed linkages 78 and 80 are mounted on the apparatus. The two-armed linkage 78 has its first end generally designated at 82 and 84 pivotally connected to the block which, in this embodiment, is the rigid plate 64. Pivotal connection is provided by way of the pins 86 and 88. The second end of the two-armed linkage generally designated 90 and 92 is pivotally connected to the support frame through the brackets 76 by way of the pins 94 and 96.

A similar construction for the two-armed linkage 80 is provided on the other side of the apparatus, as pivotally connected at a first end to the block in the form of the upright plate 62 and at a second end to the bracket 74 which is part of the support frame 66. To provide for spacing between the plates 62 and 64, sleeves 98 and 100 are provided between the inner faces 102 and the opposing inner face, not shown, of plate 64. The sleeves 98 and 100 enclose the pins 86 and 88. Similarly with the brackets 74 and 76, spacing is maintained therebetween by the sleeves 104 and 106 which in turn enclose the pins 94 and 96.

In accordance with a preferred embodiment of this invention, the two-armed linkage on each side of the apparatus is in the form of a parallelogram linkage. By way of the pivotal connection of the parallelogram linkage on each side, the block 50 in the form of plates 62 and 64 maintains an essentially vertical orientation as the block is raised from a lowered position as shown in FIG. 3 to the elevated position as shown in FIG. 2. It is appreciated that a variety of two-armed linkage arrangements may be provided which will enable a raising and lowering of the block 50 while maintaining it in a generally upwardly extending orientation. Hence the linkage need not necessarily be a parallelogram linkage, but some other form of two-armed linkage which may have slightly eccentric pivotal mountings yet continues to provide for a generally upward extension of the block as it is raised to its elevated position to ensure a capturing of the ICC bar 36.

As illustrated in FIGS. 2 and 3, the two armed linkage consists of individual arms which are "dog-leg" or L-shaped. According to this particular embodiment, the shape of the individual arms provides for an extended vertical travel of the plates 62, 64 from the lowermost position to the fully raised position. With the dog-leg shape provided in the individual arms, it permits raising of the plates 62, 64 to an increased height, while at the same time accommodating very low ICC bars. With this arrangement, heights can be covered from approximately eleven inches up to approximately thirty inches.

The drive mechanism for raising and lowering the block 50 is in the form, in accordance with a preferred embodiment of this invention, of a ram 108 consisting of a cylinder 110 and a piston 112. The cylinder 110 has a base plate 114 which is bolted by bolts 116 to the base plate 68. This rigidly sets the cylinder base 114. The piston 112 is raised and lowered by controlling the direction of flow of pressurized hydraulic fluid in the line 118 in accordance with standard hydraulic cylinder practice.

The upper end 122 of the piston engages a roller 124 rotatably mounted on pin 126. The roller is spaced centrally between the upper link arms of the pair of linkages 78 and 80 by sleeves 128 and 130. In a manner to be explained in more detail with respect to FIGS. 4, 5 and 8, the raising and lowering of the block 50 will be described.

As an option for protecting the apparatus 30, a guard may be installed about the linkage mechanism to avoid any damage thereto which may be caused by machinery operating in the pit area. In accordance with this invention, the guard generally designated 132 is secured to the frame 66 of the apparatus. The guard 132 has spaced-apart upper bars 134 and 136. In the front there are vertically extending bars 138 and 140. To maintain the spacing between the bars 138 and 140 is a rigid plate 142 which is welded to the faces of the bars 138 and 140. The bars 134 and 136 may be tubular and have an interior square hollow cross section. Secured to the upright plate 70 are studs 144 and 146. The hollow open ends 148 and 150 of the bars 134 and 136 are placed over the studs 144 and 146. Bolts 152 are then passed through the apertures 154 and 156 and the threaded portion of the bolt is threaded into the aperture 158. Such technique secures both sides of the guard to protect the linkage and drive mechanism.

Figure 4:
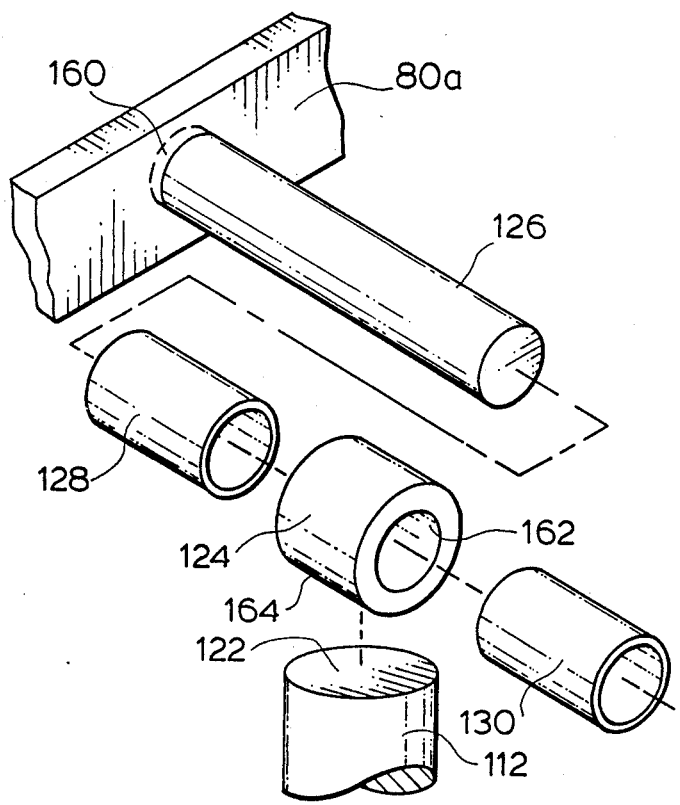
FIG. 4 shows the assembly of the roller for the linkage mechanism of the apparatus.
Figure 5:
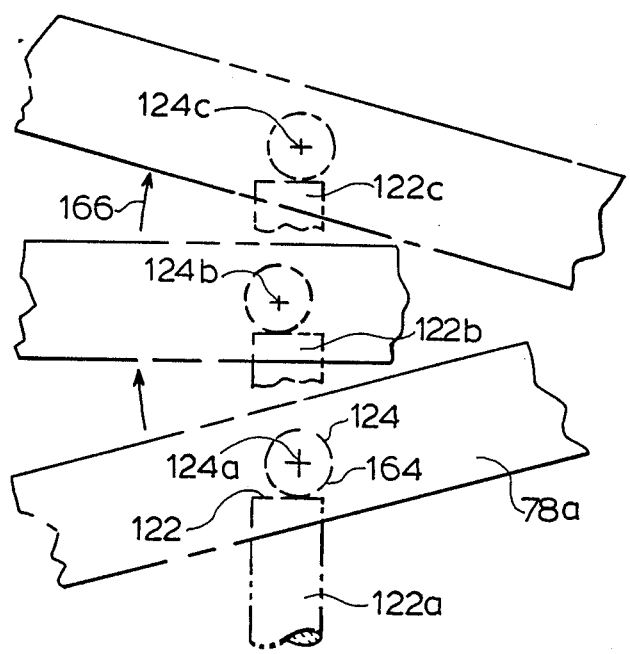
FIG. 5 is a side elevation showing the action of the piston on the roller bearing system of the apparatus linkage.

As shown in FIG. 4, an upper link arm 80a has the pin 126 secured thereto at fitting 160. The roller 124 has a central bore 162 which receives the diameter of the pin 126. As already noted to space the roller 124 centrally of the pin 126, sleeves 128 and 130 are provided which slide over the pin 126 on each side of the roller 124. Suitable bearing material may be included on the inside of the roller 124 in accordance with well known techniques. The roller exterior surface 164 engages the flat upper surface 122 of the piston 112. Due to a rigid fixed mounting of the cylinder base 114, the piston 112, in its movement from a lowered position as shown at 122a in FIG. 5 to an elevated position at 122c, moves along a vertical path as demonstrated by the sequential positions of 122a, 122b and 122c. The roller as designated at 124 and connected to the upper pivot arm 78a swings through an arc defined by the locus of points 124a, 124b, and 124c as the linkage raises in the direction of the arrow 166. As a result, the contact point between the outer surface 164 of the roller and the upper face 122 of the piston moves across the face of the piston as the roller moves through this arcuate path. This is, of course, due to the fact that the upper pivot arm 78a is pivoted at 96 to the bracket 76 of the support frame. Hence the upper surface 122 of the piston must be of sufficient width to accommodate this reciprocal relative motion of the roller 124 across the face of the piston as the linkage is swung from its lower to its upper position.

Figure 6:
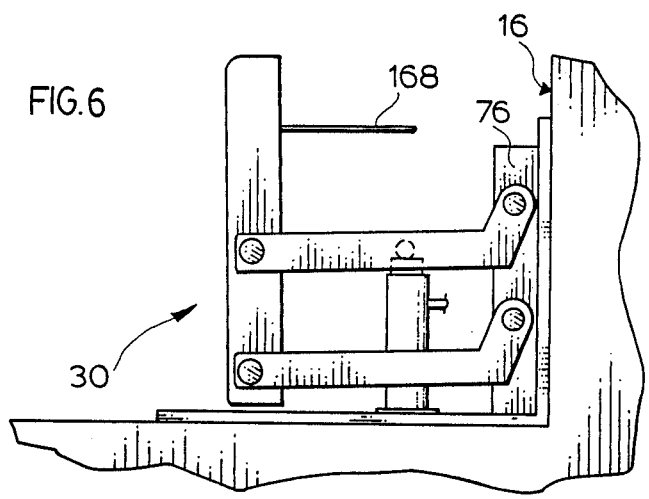
FIG. 6 is a side elevation of the apparatus in the lowered position with the vehicle sensor in a first position.
Figure 7:
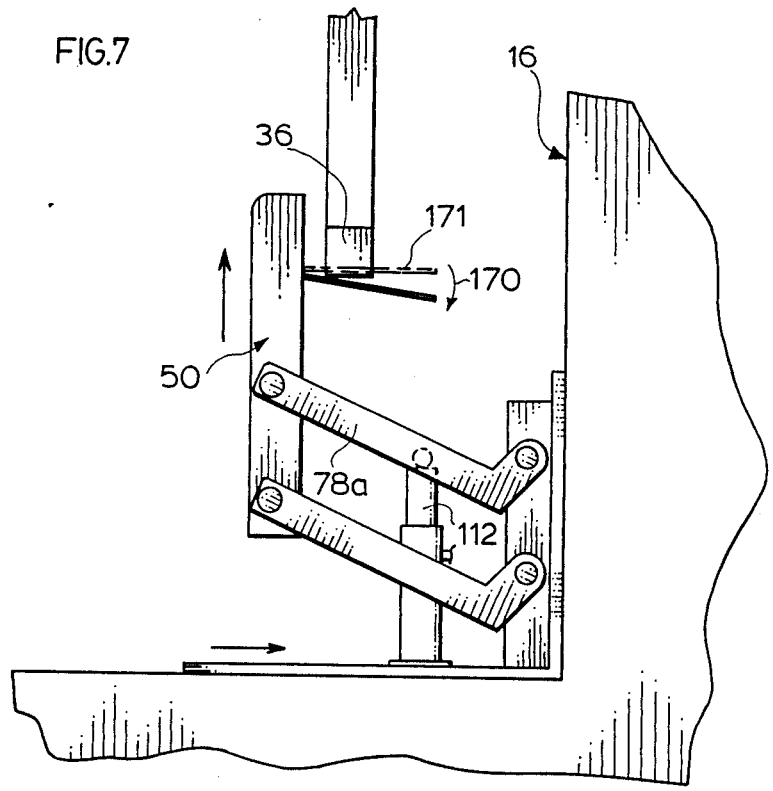
FIG. 7 is a side elevation of the apparatus in the elevated position with a parked vehicle in place and the vehicle sensor in a second position.

As shown in FIGS. 3 and 6, the apparatus 30 is in the lowered position. A feeler arm 168 is pivotally mounted at 170 to a microswitch casing 172 which is in turn secured between plates 62 and 64. The purpose of the feeler arm 168 is to sense when the ICC bar of the truck is behind the plates 62 and 64. If in actual fact the ICC bar 36 of the vehicle is in the correct position, then when the truck backs up towards the face 16 of the dock and the apparatus is raised, the feeler arm 168 will be rotated in the direction of arrow 170 from its resting position indicated by dotted line 171. This pivotal action of the feeler arm 168, as shown in FIG. 7, moves the microswitch 172 to a second position which generates a second signal via leads (not shown) to the controller mechanism. The operator standing at the dock, once determining that the vehicle is backed up against the dock, will actuate the control mechanism to elevate the block 50 to the position shown in FIG. 7. This is accomplished by extending the piston 112 to the extent shown by exerting upward pressure on the upper link arms of the linkage. Providing the ICC bar or other prescribed portion of the vehicle is captured between the block 50 and the dock face 16, the presence of such captured vehicle portion will be indicated by the pivoting of the feeler arm 168 and transmission of a signal through to the controller.

Figure 8:
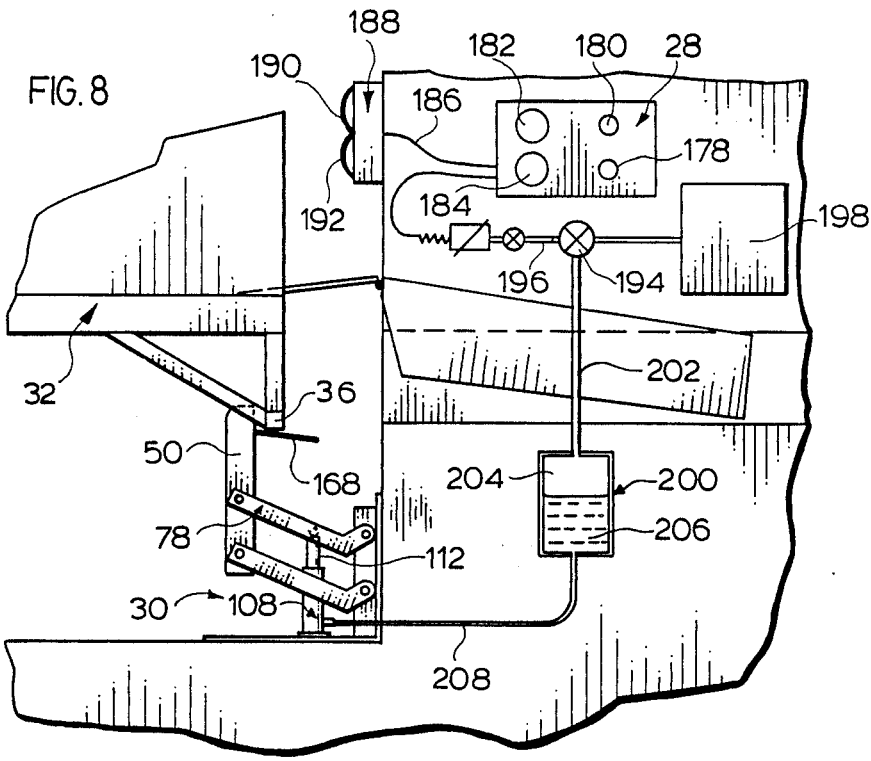
FIG. 8 schematically demonstrated the controls for raising and lowering the apparatus.
Figure 9:
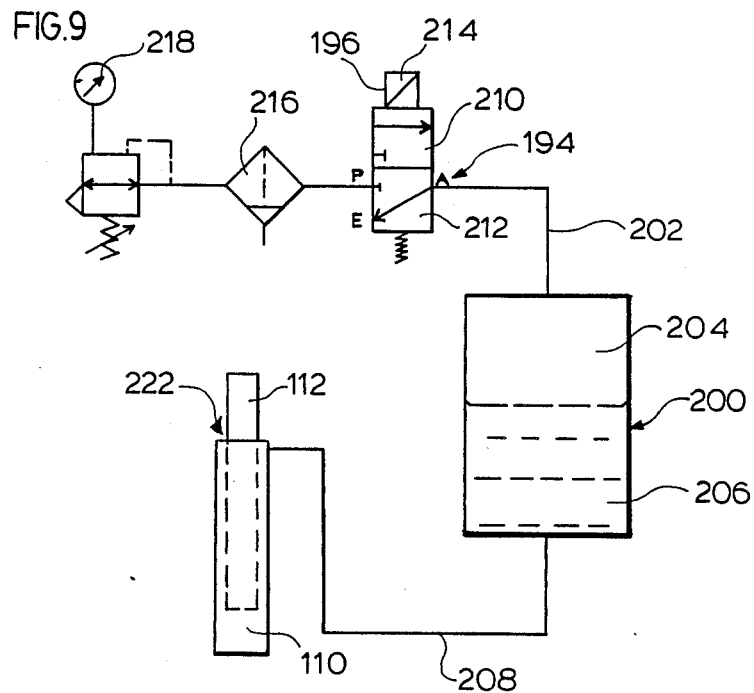
FIG. 9 is a schematic of the pneumatics of the system.

FIGS. 8 and 9 show a preferred embodiment of the air over hydraulics and control system for the apparatus. As shown in FIG. 1, the control panel 28 may be mounted on a post in the floor 12 of the dock. The control panel has up and down control button 178 and on/off switch 180. Also provided on the control panel is a red light 182 and a green light 184. With switch 180 in the "on" position, the red light is illuminated to indicate that i) the apparatus 30 is in a lowered position, ii) it is not capturing a vehicle portion, or iii) the feeler arm 168 has not been sufficiently displaced to indicate that a portion of the vehicle has been captured behind the block 50. When the green light 184 is illuminated, this indicates that everything is in acceptable form where the ICC bar is captured behind the elevated block 50 in the manner shown in FIG. 8. Details of such control circuitry for illuminating the lights will be discussed with respect to FIG. 10.

A similar signal is sent via line 186 to an exterior lamp 188 which has a red light 190 and a green light 192. Outside, the function of the lights is reversed. Hence the driver of the truck can observe through the rear view mirror the status of engaging the restraining device with the vehicle ICC bar. The green light indicates to the driver that he can continue to back up the vehicle towards the dock. It is not until the driver sees the red light 192 come on that he knows the system is locked in place.

When the button 180 is pushed to elevate the apparatus 30, the solenoid valve 194 is opened by way of a signal transmitted in lines 196. This permits compressed air from the air compressor 198 to enter the air oil reservoir 200 via the line 202. As pressure builds up in the upper portion 204 of the reservoir, the hydraulic oil 206 is forced through line 208 to extend the piston 112. When it is desired to lower the apparatus 30, the button 178 is pushed which closes the solenoid 194 and opens the solenoid valve 210 by way of a signal transmitted in line 212. The opening of the valve 210 exhausts pressurized air from the upper portion 204 of the reservoir to atmosphere via outlet 214. As the pressurized air bleeds through the outlet 214, the pressurized oil in line 208 flows back up into the reservoir 200 allowing the piston 112 to descend under the influence of gravity by the weight of the block 50 in the linkage arms 78 and 80.

As shown in FIG. 9, the double acting valve 194 has two distinct blocks 210 and 212. A solenoid 214 is actuated by a signal in line 196. To move the valve from the position shown in FIG. 9, exhausting pressurized air from line 202 to a position where block 210 is in line to transmit pressurized air from the line 214 through line 202 to the reservoir 200. The pressurized air line is equipped with a trap 216 to remove oils and the like therefrom. Pressure gauge 218 is included in the line in conjunction with a regulator 220. With the valve 194 in the position shown, air is being exhausted from reservoir 200 which results in the piston 112 lowering in the direction of arrow 222. In the event of power failure, the solenoid 214 is released to permit movement of block 212 into communication with the pressurized line 214 to exhaust air. This permits the block to lower and release the truck.

Figure 10:
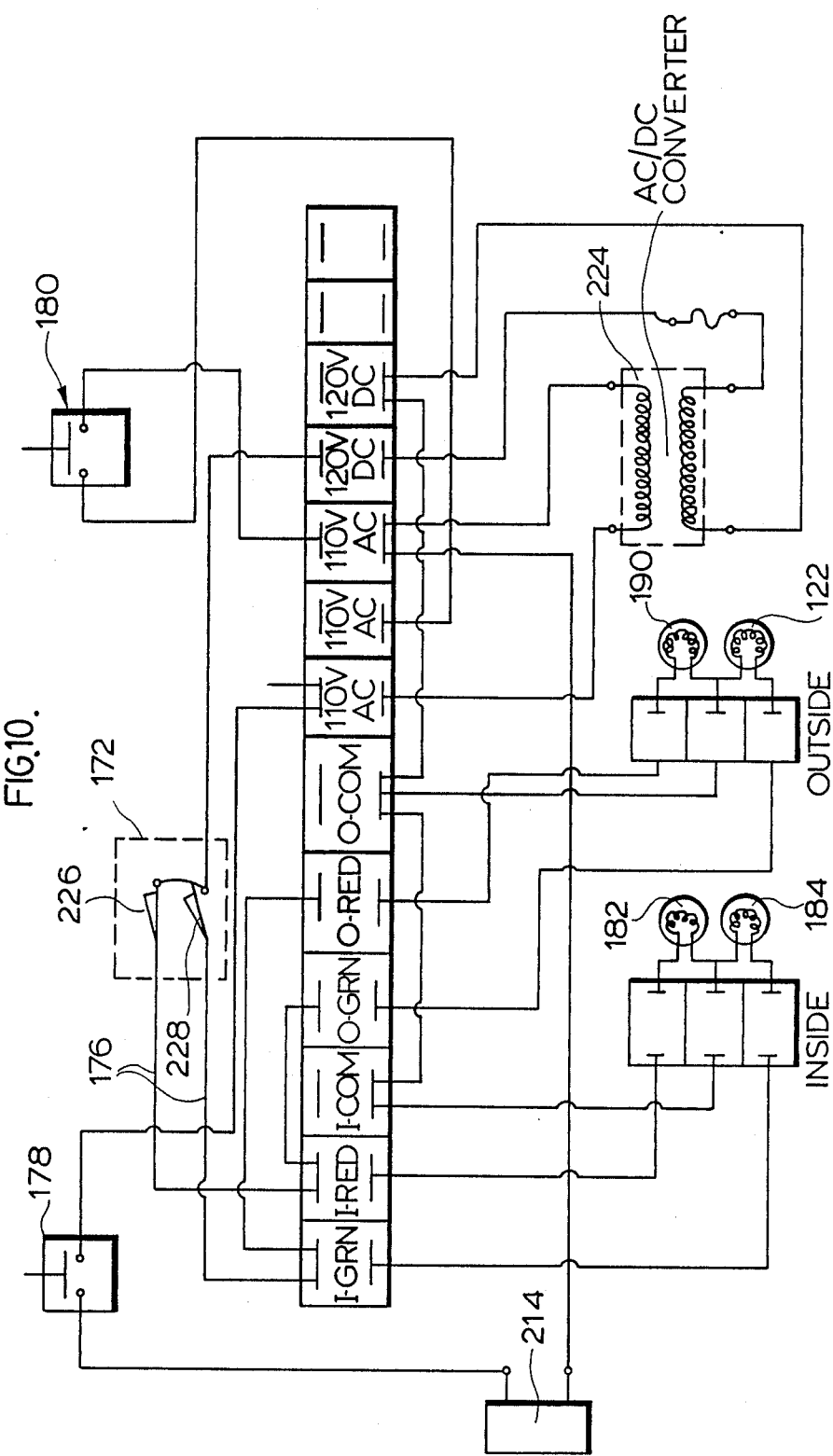
FIG. 10 is an electrical schematic showing details of the system control.

As shown in FIG. 10, a 115 volt AC source supplies voltage to the system. An AC converter 224 converts the average 110 volt AC to 12 volts AC. With the power switch 180 in the "on" position, the red inside light 182 is lit because the limit switch 172 closes contact 226 and opens contact 228. This supplies 12 volt DC power to the red light 182. When the on/off switch 180 is switched to the "on" position, the red inside light remains on, whereas the outside green light 192 is also "on" to signal the truck driver that he is to back the vehicle up against the dock. When the microswitch 172 senses that the vehicle is in position, contact 228 is closed and contact 226 is opened which illuminates the green light 184 on the inside and the red light 190 on the outside to indicate to the driver that the system is locked. The green light on the inside indicates to the operator that the block 50 can now be raised to capture the vehicle ICC bar. In closing the switch 178, solenoid 214 is actuated to move the valve to align block 210 with the pressurized line 214 and hence pressurize the reservoir 200 to elevate the piston 112 and in turn place the block 50 in front of the ICC bar 36. In reversing the procedure, the block 50 will fade thereby turning on the inside red light 182 and the outside green light 192.

An advantage in using the air/oil reservoir system is that the block with associated linkage may be moved up and down slightly. This may result in situations where the vehicle is being loaded and the truck bed drops due to increasing weight in the truck. As the ICC bar continues to lower, it may engage the linkage. Due to the compressibility of the air, the linkage will move downwardly without bending the apparatus. In providing this type of linkage system for the block, the height range for the block may vary considerably from a lowermost position of approximately 15 inch height up to an uppermost position in the range of 28 to 30 inch height. Due to the rugged construction of the system, it is very durable in extended periods of use. However, should repair be required, it is readily accessible for replacing the parts and maintenance. In view of its open construction, it is easy to clean particularly in view of the fact that the block with linkage may be lifted upwardly away from the piston when the piston is not actuated. By use of air pressure with the air/oil interface, low air pressures may be used which works in combination with the linkage because high air pressures are not needed to effect an upward movement of the block. Also due to the fact that the linkage may be lifted off of the cylinder permits a user to manually set up and lock the block in the elevated position when air pressure is not available to raise the air cylinder. It is also appreciated that other types of drive devices may be employed to swing the linkage mechanism in raising and lowering the block 50. A suitable mechanical jack with electric or hydraulic motor drive may be used. The end of the jack can engage the roller 124 to raise and lower the block. A hydraulic electrically driven screw may be used which by rotational movement raises and lowers the block 50. The end of the screw may engage the roller 124 to cause the necessary swinging movement in the linkage.

Figure 11:
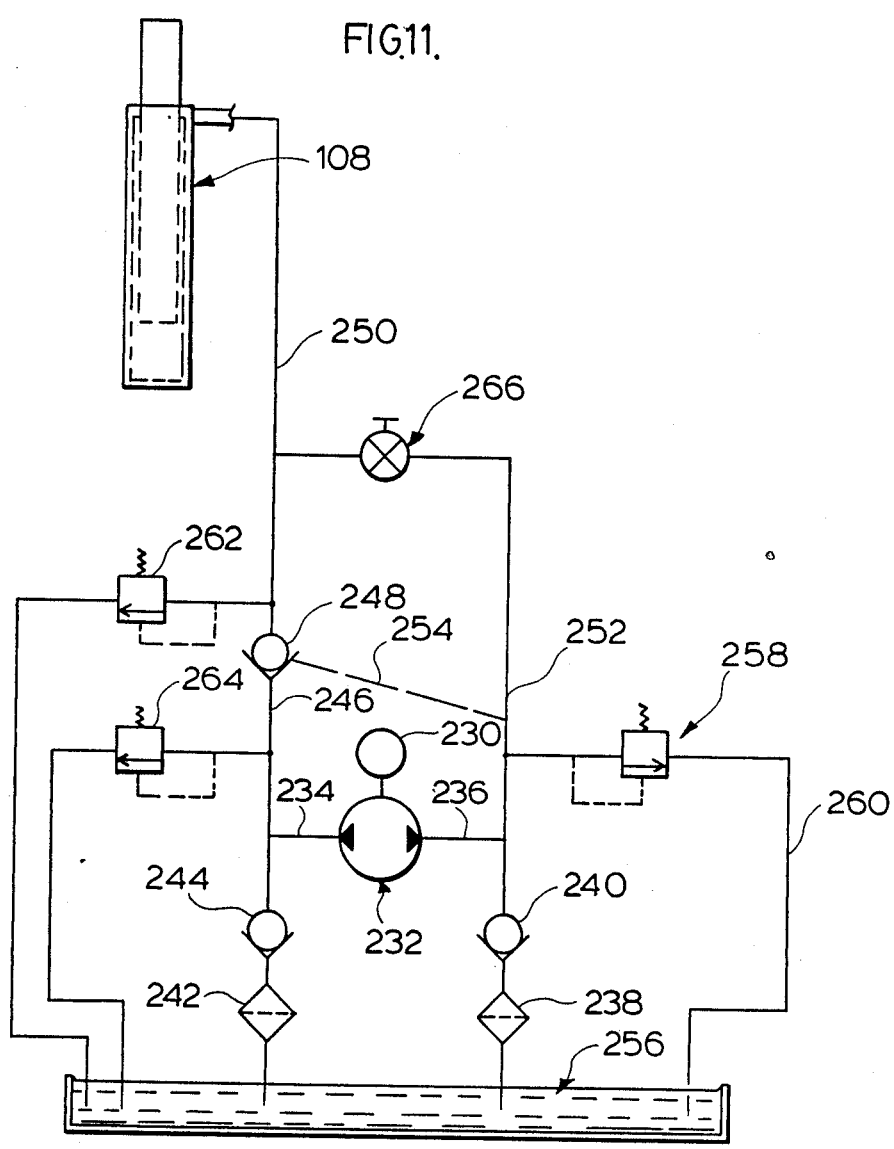
FIG. 11 is a schematic of an alternative embodiment for raising and lowering the apparatus.

With reference to FIGS. 11 and 12, an alternative control system and driving mechanism is shown for raising and lowering the single acting hydraulic piston and cylinder. The hydraulic system of FIG. 11 does not involve an air over oil system, instead the cylinder is directly raised and lowered by pressurized hydraulic fluid, the motor 230 for driving the hydraulic pump 232. The motor 230 is adapted to drive the pump in one of two directions which results in delivering pressurized hydraulic fluid in either line 234 or 236. When the motor drives the pump 232 in a first direction to deliver pressurized hydraulic fluid in line 234, the hydraulic fluid is drawn through filter 238 and check valve 240. In the reverse direction, that is the second direction for the pump 232, the hydraulic fluid is drawn through filter 242, check valve 244 and through line 234.

When the pump 232 is driven in the first direction, the pressurized hydraulic fluid is delivered through line 246 to open pilot check valve 248 and supply pressurized fluid to the one way cylinder 108 through line 250. As the cylinder 108 is raised, as with the embodiment discussed in FIG. 6 and 7, the restraining block is positioned in advance of the ICC bar. When it is desired to lower the restraining block, the motor 230 reverses the direction of the pump 232 to deliver pressurized fluid into line 236. This in turn places pressure in line 252 which is transferred to the pilot check valve 248 through line 254. The pressure in line 254 is sufficient to open the pilot check valve 248 and allow the pump 232 to draw fluid from the cylinder 108 through lines 250 and 234 to allow hydraulic fluid to flow from the cylinder 108. The fluid as it withdrawn from the cylinder and pumped into line 236 is returned to the reservoir 256 by popping the pressure relief valve to 258 to allow the pumped hydraulic oil to return to the reservoir via line 260.

Pressure relief valves 262 and 264 are provided on both sides of the pilot check valve 248 to relieve the pressure developed by the pump 232 when rotating in the first direction should there be a blockage down stream of the pilot check valve or up stream by the cylender to avoid damage to the pump 232 and the motor 230. Excessive pressure can be developed in the cylendar 108 when the truck under load drops due to give in the truck suspension. The pressure line 250 is relieved through valve 262 to avoid any damage to the motor and allows the restraint to float with the truck bed.

In the event of power failure, a normally closed manually openable valve 266 is provided. Should the truck restraint be in the raised position, the valve 266 can be opened to release hydraulic oil from the cylinder 108. The pressure setting of the pressure release valve 258 is such that the pressure of the oil in the cylinder is sufficient to open the pressure release valve 258 and permit oil to drain through line 260 into the reservoir 256.

The electrical controls and lighting system for the system of FIG. 11 is shown in FIG. 12. The reversing motor 230 has 4 electrical leads 232, 234, 236 and 238 which are designated red, black, blue and yellow respectively. The red line includes a start capacitor 241. The reversing motor 230 has its direction reversed by switching the connections of the blue and yellow lines 272 and 274. This is accomplished by the up-down switch 276. When the switch is in the position shown, the power to the motor as supplied in lines 278 and 280 when the key switch 282 is closed is such to drive the motor in the reverse direction. When the switch is moved to the second position, the position of the yellow and blue lines on the contacts is such to drive the motor to 230 in the second direction when the key switch 282 is closed. To provide additional protection of the system, the key switch includes a fuse 284.

The limit switch as discussed in FIG. 6 and 7 which detects the presence of the ICC bar is in the normally closed position with the restraining block in the lowered mode. Hence, when the key switch is turned on with the outside lights 286, the green light 288 is on and with the inside lights 290, the red light 292 is on. As with the circuit of FIG. 10, the green light on the exterior indicates the driver may back up, whereas on the inside the red light indicates that it is not safe to approach the ramp. The control of the outside and inside lights and the operation of the buzzer 294 is determined by the restraining block position sensor 296. Preferably the restraining block position sensor is mounted on either of the shafts 94 or 96 of the pivot assembly of FIG. 3. As the shaft rotates from the block lowered position, to the block upper position, a double pole limits switch 296, is moved to move the switches to their second position. As shown in FIG. 12, the switches are in the contact position for, the block in the lower position. Hence, contacts 1 and 2 are closed and 5 and 6 are closed. Contacts 3 and 4 are open as well as contacts 7 and 8. As the restraining block is raised by actuation of the motor 230 through switch through switch 276, contacts 7 and 8 are closed and 5 and 6 are open, while 1 and 2 remain closed. Once the restraining block is in its upper elevated position, contacts 3 and 4 close and contacts 1 and 2 open. At the same time as the restraining block is raised, the limit switch arm sensor 172 moves from the normally closed position to the open position. As this sequence of events occurs, the inside lights are reversed to illuminate the green light 300 to indicate that the truck is now restrained and it is safe to approach the ramp. The outside lights are reversed to illuminate the red light 298 when contacts 5 and 6 are closed.

In the event that the restraining block is raised to its upper most position but the limit switch arm 172 remains in the normally closed position, the buzzer 294 is actuated to sound an alarm to indicate that ICC bar of the truck has not been engaged. Hence, the operator must inspect visually to determine the problem, relocate the truck if necessary to ensure engagement before the ramp can be safely approached.

With the system of FIGS. 11 and 12, a direct hydraulic drive system is provided to effectively raise and lower the truck restraining block in an efficient simplified manner using readily available components. This system is adapted to alert the user when the restraining block is not engaged so that the problem can be inspected and corrected. In the event of power failure, the system may be manually operated to lower the restraining block when it is desired to remove the trailer from the loading dock.

Although preferred embodiments of the invention have been described herein in detail, it will be understood by those skilled in the art that variations may be made thereto without departing from the spirit of the invention or the scope of the appended claims.

The embodiments of the invention in which an exclusive privilege or property is claimed are defined as follows:

1. An apparatus for restraining movement of a parked vehicle away from a fixed structure, said apparatus comprising a support frame, an upwardly extending block, a sensor arm mounted on said block a linkage having two spaced-apart link arms and means for driving said linkage for raising and lowering said linkage, a first end of said two link arms being pivotally connected to said block and a second end of said two link arms being pivotally connected to said support frame, said two link arms being a parallelogram linkage which serves to substantially maintain said block in a vertical position throughout its travel from its lower position, said drive means for raising and lowering said first end of said linkage determining an upper position for said block to capture a portion of a vehicle frame to restrain a parked vehicle and a lower position for said block to permit a parked vehicle to move away from a fixed structure said sensor arm extending away horizontally from said block towards said second end of said two link arms, said sensor arm contacting a portion of a vehicle frame which is captured by said block to indicate thereby that a parked vehicle is restrained by said apparatus.

2. An apparatus of claim 1, wherein said support frame has a removable guard.

3. An apparatus of claim 1, wherein said horizontally extending sensor arm is a movable feeler which is mounted on said block and movable between first and second positions, said feeler being positioned on said apparatus to engage a portion of a vehicle frame, said feeler being in said first position in absence of a vehicle and moved to said second position in response to a vehicle moving over said apparatus to engage a portion of a vehicle frame with said feeler, a microswitch being operatively associated with said feeler to indicate electrically when said feeler is in either said first or second positions and thereby indicate a proper positioning of a portion of a vehicle over said apparatus to be captured by said block when elevated by said drive means.

4. An apparatus of claim 1, wherein said drive means includes means for locking said drive means in an operative ;mode in which said block is in said upper position.

5. An apparatus of claim 1, wherein said support frame, said linkage and said extending block are steel.

6. An apparatus for restraining movement of a parked vehicle away from a fixed structure, said apparatus comprising a support frame, an upwardly extending block, a linkage having two spaced-apart link arms and means for driving said linkage for raising and lowering said linkage, a first end of said two link arms being pivotally connected to said block and a second end of said two link arms being pivotally connected to said support frame, said drive means for raising and lowering said first end of said linkage determining an upper position for said block to capture a portion of a vehicle frame to restrain a parked vehicle and a lower position for said block to permit a parked vehicle to move away from a fixed structure, wherein said drive means for raising and lowering said linkage is a ram fixed on said support and lowering said linkage is a ram fixed on said support frame beneath said linkage, said ram having a piston for slidably engaging said linkage whereby the extension of said piston raises said linkage to correspondingly raise said block.

7. An apparatus of claim 6, wherein said ram is controlled by an independent air-oil reservoir so that air pressure in said reservoir acts to pressurize said ram by introducing oil under pressure into said ram thereby raising said piston and correspondingly the block, release of the air pressure from said reservoir releases the oil pressure allowing said piston to lower and correspondingly the block.

8. An apparatus of claim 6, wherein said linkage comprises a pair of first and second parallelogram linkages, said first and second linkages being spaced apart and pivotally connected at their first ends to a respective side of said block, said first and second linkages being pivotally connected at their second ends to said support frame.

9. An apparatus of claim 8, wherein said linkage has means to slidably engage a distal end of said piston, said means comprising a rotatable bearing mounted on a shaft spanning said spaced-apart pair of parallelogram linkages, said shaft being mounted intermediate the first and second ends of said linkages.

10. An apparatus of claim 8, wherein each of said linkages comprises an arm which is substantially L-shaped.

* * * * *